US011947731B2

(12) United States Patent
Turner et al.

(10) Patent No.: US 11,947,731 B2
(45) Date of Patent: Apr. 2, 2024

(54) INTENTION-BASED USER INTERFACE CONTROL FOR ELECTRONIC DEVICES (71) Applicant: Apple Inc., Cupertino, CA (US)

(72) Inventors: James T. Turner, San Jose, CA (US); Peter L. Hajas, Lafayette, CO (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/125,114

(22) Filed: Mar. 22, 2023

(65) Prior Publication Data

US 2023/0229241 A1 Jul. 20, 2023

Related U.S. Application Data (63) Continuation of application No. 17/980,510, filed on Nov. 3, 2022, now abandoned.

(60) Provisional application No. 63/281,599, filed on Nov. 19, 2021.

(51) Int. Cl.
*G06F 3/048* (2013.01)
*G06F 3/01* (2006.01)
*G06F 3/04815* (2022.01)
*G06F 3/16* (2006.01)

(52) U.S. Cl.
CPC .............. *G06F 3/017* (2013.01); *G06F 3/013* (2013.01); *G06F 3/04815* (2013.01); *G06F 3/167* (2013.01)

(58) Field of Classification Search
CPC ...... G06F 3/017; G06F 3/013; G06F 3/04815; G06F 3/167
See application file for complete search history.

(56) References Cited

U.S. PATENT DOCUMENTS

| 7,561,143 | B1 | 7/2009 | Milekic |
| 11,200,869 | B1* | 12/2021 | Post .................... G06F 3/04842 |
| 11,330,229 | B1* | 5/2022 | Crumley .......... H04N 21/47217 |
| 11,704,091 | B2* | 7/2023 | Browy .................. H04R 1/028 345/8 |
| 2016/0225012 | A1 | 8/2016 | Ha et al. |
| 2019/0018498 | A1* | 1/2019 | West ....................... G06F 3/012 |
| 2019/0232500 | A1* | 8/2019 | Bennett ................ G06T 19/006 |
| 2019/0236842 | A1* | 8/2019 | Bennett .................. G06F 3/011 |
| 2019/0362557 | A1* | 11/2019 | Lacey .................... G06F 3/017 |
| 2020/0150435 | A1* | 5/2020 | Rodriguez, II ....... G06F 3/0304 |
| 2020/0219320 | A1* | 7/2020 | Moniri ................... B60K 35/00 |
| 2020/0357183 | A1* | 11/2020 | Weber .................... G06F 3/013 |
| 2021/0090332 | A1 | 3/2021 | Ravasz et al. |

(Continued)

OTHER PUBLICATIONS

International Search Report and Written Opinion from PCT/US2022/050164, dated Mar. 16, 2023, 10 pages.

*Primary Examiner* — David Phantana-angkool
(74) *Attorney, Agent, or Firm* — BAKERHOSTETLER (57) ABSTRACT

Aspects of the subject technology provide for intention-based user interface control for electronic devices. For example, an electronic device may utilize multiple indirect engagement indicators performed by a user of the electronic device, to confirm which of several displayed user interfaces with which the user intends to engage. Once the electronic device determines which of the multiple user interfaces the user intends to engage with, the electronic device may provide a user input to the application or other process underlying that user interface. The user input may be based, in whole or in part, one or more of the multiple indirect engagement indicators.

20 Claims, 6 Drawing Sheets

(56) References Cited

U.S. PATENT DOCUMENTS

| | | | |
|---|---|---|---|
| 2022/0214743 A1* | 7/2022 | Dascola | G06F 3/011 |
| 2023/0094658 A1* | 3/2023 | Chinn | G06T 1/60 |
| | | | 345/428 |
| 2023/0095816 A1* | 3/2023 | Cohen | G06F 21/31 |
| | | | 726/7 |
| 2023/0102820 A1* | 3/2023 | Ma | G06F 3/011 |
| | | | 345/633 |
| 2023/0116190 A1* | 4/2023 | Kies | G06F 3/0482 |
| | | | 715/236 |
| 2023/0152886 A1* | 5/2023 | Sztuk | G06F 3/04842 |
| | | | 345/156 |
| 2023/0229241 A1* | 7/2023 | Turner | G06F 3/011 |
| | | | 715/728 |

\* cited by examiner

INTENTION-BASED USER INTERFACE CONTROL FOR ELECTRONIC DEVICES

CROSS REFERENCE TO RELATED APPLICATIONS

This application is a continuation of U.S. patent application Ser. No. 17/980,510, entitled "Intention-Based User Interface Control For Electronic Devices," filed on Nov. 3, 2022, which claims the benefit of priority to U.S. Provisional Application No. 63/281,599, entitled "Intention-Based User Interface Control for Electronic Devices," filed on Nov. 19, 2021, the disclosure of each of which is hereby incorporated herein in its entirety.

TECHNICAL FIELD

The present description relates generally to electronic devices including, for example, intention-based user interface control for electronic devices.

BACKGROUND

Extended reality technology aims to bridge a gap between virtual environments and a physical environment by providing an enhanced view of a physical environment that is extended with electronic information. As a result, the electronic information appears to be part of the physical environment as perceived by a user.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide confirmation of user engagement with an application user interface displayed in an extended reality environment, prior to providing user input to the application. In contrast, for example, with a physical device display in which the user directly touches or moves a controller of a device to the location on the display of a user interface for an application for which control is desired, in an extended reality environment, a user interface (UI) may be displayed to appear at a location in a physical environment that is remote from the device itself. Thus, inputs to the UI by the user may be performed at a location that is physically separated from the device and from the apparent location of the UI.

Moreover, a user may move their hand and/or direct their gaze at or near a displayed application user interface (UI) without intending to interact with the application UI (e.g., due to normal motion of the user around the physical environment, such as during a conversation with another person unassociated with the electronic device), and/or may perform hand gestures for interaction with one displayed application UI that are not intended to be provided to an application associated with another displayed application UI.

In one or more implementations of the subject technology, two or more engagement indicators (e.g., including gaze data, hand gestures or other user gestures, and/or voice input) can be received by an electronic device. The two or more engagement indicators may be coordinated to identify user engagement with a UI (e.g., to confirm a user's intent to engage with that UI) before a user input based on one or more of the engagement indicators is provided to the application for that UI. For example, even if a user gazes at a UI that is displayed in an XR environment, the underlying application for that UI may not receive gaze information unless the user has expressed an intent to engage with that UI through at least one secondary signal (e.g., a voice command or a hand gesture). Confirming user intent/engagement in this way can be helpful for efficient device operation (e.g., to ensure that user inputs are correctly directed to an intended application). Confirming user intent/engagement in this way can be also be helpful, in some uses cases, for privacy protection for the user. For example, a user performing hand gestures to enter a password into a UI of one application, may not want the hand gestures incorrectly communicated to another applications running on the same device.

Figure 1:
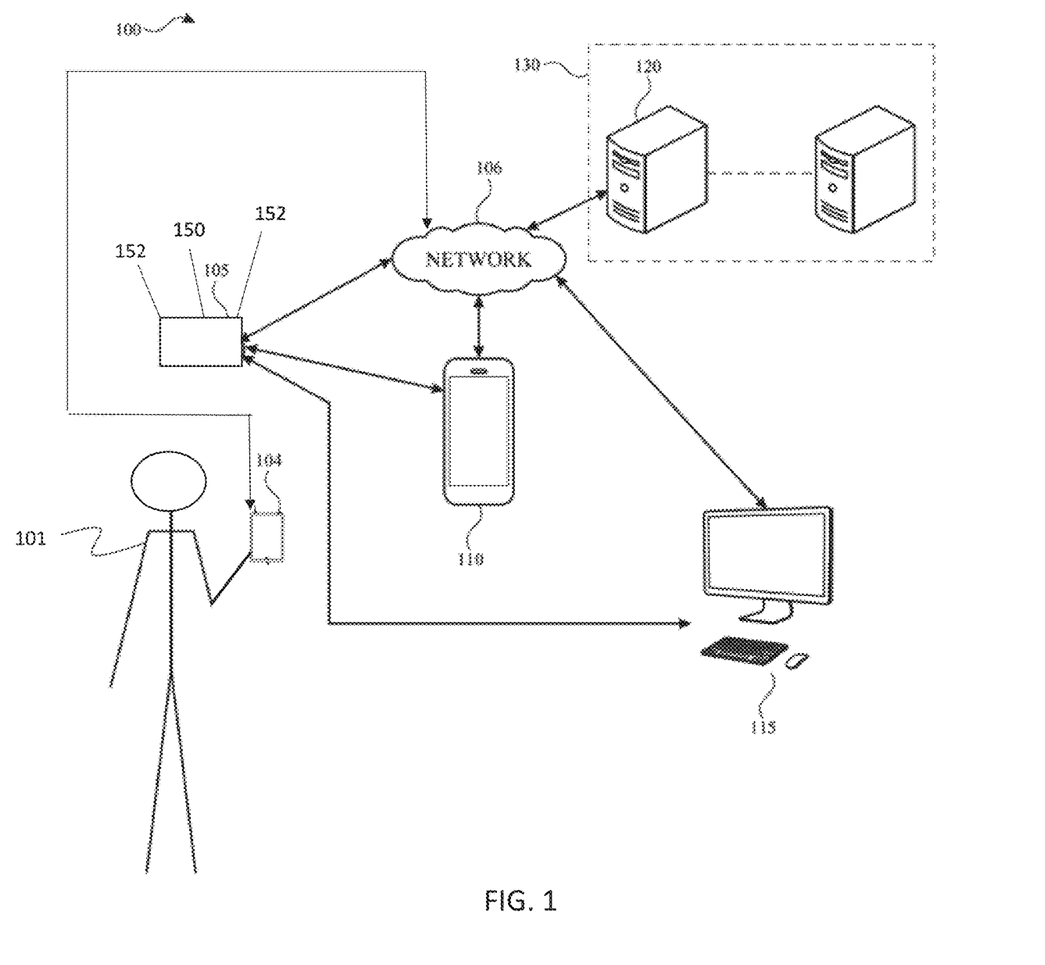
FIG. 1 illustrates an example system architecture including various electronic devices that may implement the subject system in accordance with one or more implementations.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display system capable of presenting a visualization of an extended reality environment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use an electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a living being such as a person or a pet, a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects for an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the electronic device 104, and/or the electronic device 105 may be, and/or may include all or part of, the electronic system discussed below with respect to FIG. 6. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 6.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
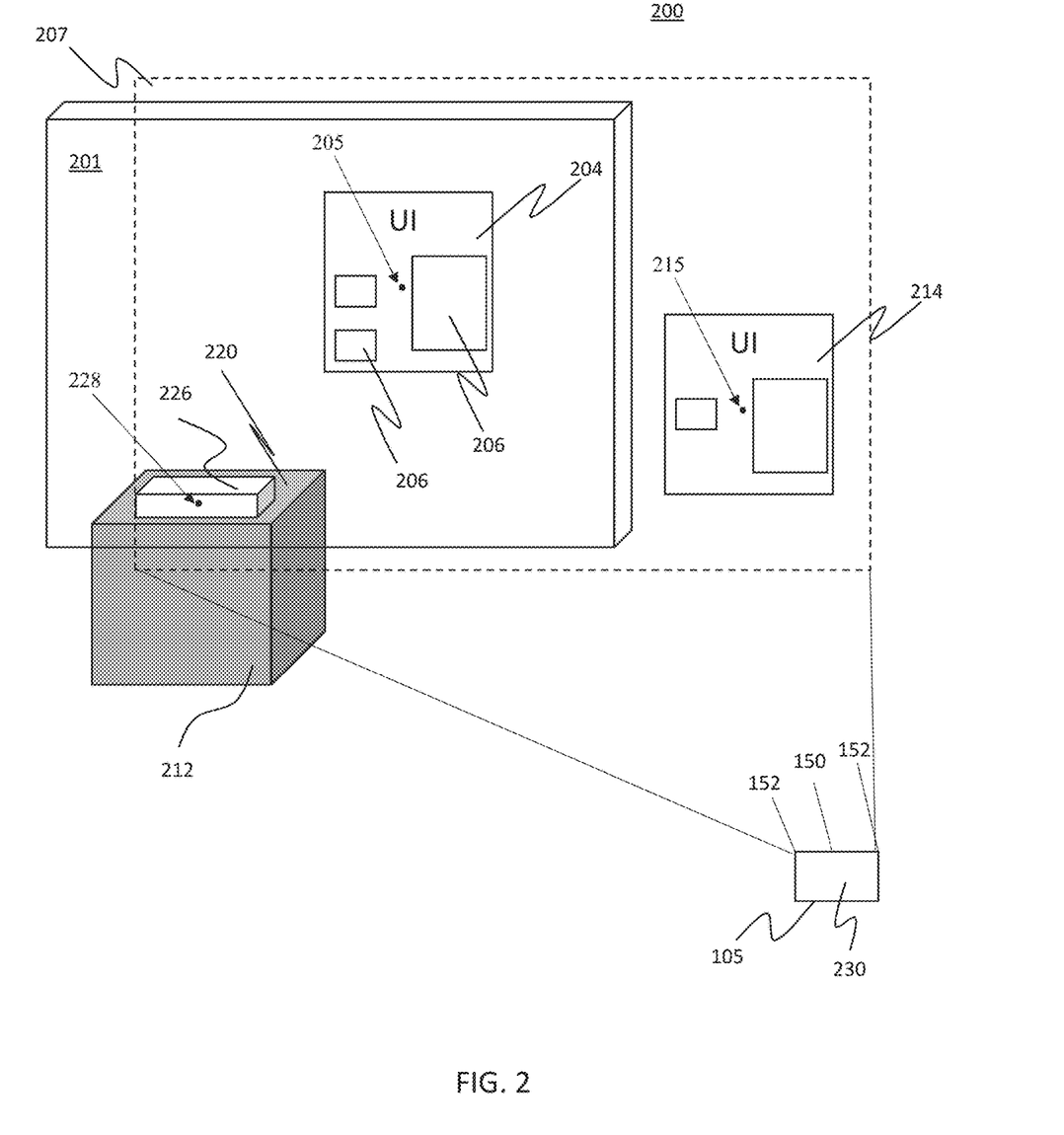
FIG. 2 illustrates an example of an extended reality environment including multiple user interfaces displayed, by a display of an electronic device, to be perceived at multiple respective locations in a physical environment in accordance with aspects of the subject technology.

FIG. 2 illustrates an example of a physical environment 200 in which the electronic device 105 may be operated. In the example of FIG. 2, the electronic device 105 (e.g., display 230 of the electronic device 105) displays virtual content in a way that causes the virtual content displayed at the electronic device 105 to appear to a user to be at various locations, remote from the electronic device 105, in a view of the physical environment 200 (e.g., at anchor locations determined by the electronic device). When the virtual content is displayed to appear in the view of the physical environment 200, the combined physical environment and the virtual content may form an XR environment.

In the example of FIG. 2, the display 230 of electronic device 105 displays a user interface (UI) 204 of an application running on the electronic device 105. In this example, the displayed location of the UI 204 on the display 230 is anchored, by the electronic device 105, to a physical anchor location 205, such that the UI 204 displayed in the viewable area 207 of the display 230 appears to the user as if disposed on a physical wall 201 in the physical environment 200 that is physically separated from the electronic device 105. As shown in FIG. 2, UI 204 may include one or more elements 206. Elements 206 may include text entry fields, buttons, selectable tools, scrollbars, menus, drop-down menus, links, plugins, image viewers, media players, sliders, gaming characters, other virtual content, or the like.

In the example of FIG. 2, UI 204 is displayed in the viewable area 207 of the display 230 of the electronic device 105 to appear, in an extended reality environment generated in part by electronic device 105, as if attached to the physical wall 201 in the physical environment 200. In the example of FIG. 2, the electronic device 105 also displays a UI 214 (e.g., a UI of another application running on the electronic device and displayed at another location within the viewable area 207 of the display 230) to be perceived by the user at another apparent location, remote from the electronic device 105, in the physical environment. In this example, the UI 214 is anchored to a virtual anchor location 215 (e.g., an anchor location in the physical environment unassociated with a physical object), and appears to the user viewing the display 230 to be a floating UI in the physical environment 200.

In the example of FIG. 2, a physical table 212 is also present in the physical environment 200. In this example, the electronic device 105 also displays a UI 226 (e.g., a UI of yet another application running on the electronic device and displayed at yet another location within the viewable area 207 of the display 230) to be perceived by the user, at an apparent location remote from the electronic device 105, on a surface 220 of the physical table 212 in the physical environment 200. For example, the displayed location of the UI 226 on the display 230 may be anchored, by the electronic device 105, to a physical anchor location 228 on the surface 220 of the physical table 212. In one or more implementations, the UI 226 may include a virtual game board (e.g., a virtual chess board, a virtual checkers board, or other virtual board game setup), a virtual keyboard, a virtual character (e.g., a virtual animal, person, or fantastical character), or any other virtual object.

In various implementations, the physical anchor locations 205 and 228, and/or the virtual anchor location 215, may be generated by each application for its corresponding UI, or may be generated by a system process of the electronic device 105 on behalf of an application, based on scene information obtained using camera(s) 150 and/or sensor(s) 152 of the electronic device. In order to interact with the applications underlying the UI 204, the UI 214, and/or the UI 226, a user may, for example, perform hand gestures or other body gestures, and/or speak voice commands that are intended to be directed to one of the UI 204, the UI 214, or the UI 226. However, because, in an extended reality environment, the user may be not physically touching any physical sensors (e.g., touch sensors) co-located with the display pixels displaying the UI, it can be difficult to determine which UI(s) (e.g., and which underlying application(s)) should receive the user input associated with the hand gesture and/or voice command, in some use cases.

Figure 3:
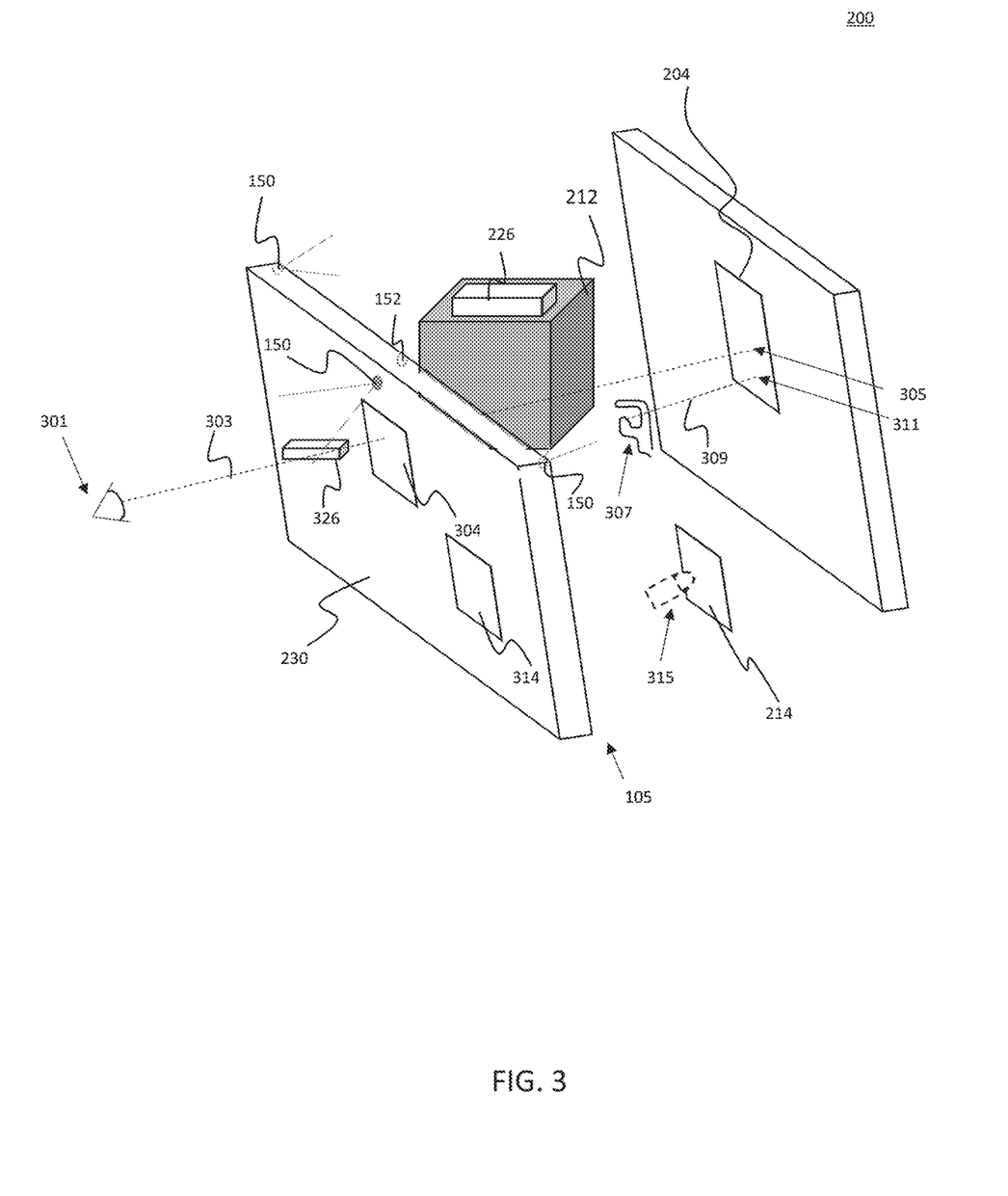
FIG. 3 illustrates various direct and indirect engagement indicators being performed in association with the user interfaces of FIG. 2 in accordance with one or more implementations.

For example, FIG. 3 illustrates an example use case in which a user is looking at (e.g., gazing on) the UI 204 and performing a hand gesture 307 intended for the UI 204. In the example of FIG. 3, the display 230 of the electronic device 105 displays a representation 304 of the UI 204, displayed at a location on the display 230 that causes the UI 204 to appear, to a user viewing the display 230, on the physical wall 201 behind the display 230 and remote from the electronic device 105 and the display 230. As shown, the display 230 of the electronic device 105 also displays a representation 314 of the UI 214, displayed at a location on the display 230 that causes the UI 214 to appear to be a floating UI that is physically separated from the location of the electronic device 105 and the display 230, and a representation 326 of the UI 226, displayed at a location on the display 230 that causes the UI 226 to appear to be located on the physical table 212 and remote from the electronic device 105 and the display 230.

In various implementations as described herein, the display 230 can be a transparent or translucent display that allows the user to view the physical environment directly through the viewable area of the display, or the display may be a pass-through video display that captures images of the physical environment and displays representations of physical environment objects on the display 230 along with the device-generated content (e.g., including the representations 304, 314, and 326 of the UIs 204, 214, and 226 in this example).

In the example of FIG. 3, the hand gesture 307 may be intended, by a user of the electronic device 105, as a gesture input to the UI 204. However, because the location of the hand gesture 307 is separate from the location of the electronic device 105 and from the apparent location of the displayed UI 204, the hand gesture 307 may be an indirect indicator of the user's engagement with that UI 204 (e.g., an indirect engagement indicator). The hand gesture 307 may be determined to be an indirect engagement indicator for the UI 204 by, for example, determining a ray 309 extending from the user's hand along a direction defined by the hand gesture 307. As examples, the direction of the ray 309 may be determined by a direction in which a finger of the user is pointing, or a direction perpendicular to a plane defined by a curved finger and thumb of the user (e.g., in a partial pinch gesture). The ray may be determined, by the electronic device 105, to intersect with and/or pass through the user interface 214. In the example of FIG. 3, the ray 309 intersects with the UI 204 at an intersection location 311 that is within the boundaries of the UI 204. In one or more implementations, the ray 309 may pass through multiple UIs that are partially overlapping in a depth dimension of the physical environment, and the electronic device 105 may (e.g., based on prior user behavior, and/or machine learning models, and/or one or more other indirect engagement indicators) disambiguate which of the multiple UIs is associated with the hand gesture 307.

In order, for example, to confirm the user's intent to engage with the UI 204 before providing a gesture input based on the hand gesture 307 to the application underlying the UI 204, the electronic device 105 may detect a second indirect engagement indicator performed by the user of the electronic device 105. For example, FIG. 3 illustrates how an eye 301 of a user can have a line of sight (e.g., a gaze direction 303) that extends along a ray that intersects with the UI 204. Although only a single gaze direction 303 for a single eye 301 is illustrated in FIG. 3, it is appreciated that, by obtaining gaze directions for both eyes of a user, the electronic device 105 can determine a gaze location 305 (e.g., a three-dimension gaze location) on which the user's gaze is landing at a given time during operation of the electronic device 105. In this example, the electronic device 105 may determine that the gaze location 305 is a location within the boundaries of UI 204. However, because, during use of the electronic device 105, the user may look around the XR environment without always engaging with an entity on which the user is gazing, the gaze location 305 may also be an indirect engagement indicator.

In one or more implementations, the electronic device may confirm the user's intent to engage with the UI 204 by determining that both the first indirect engagement indicator (e.g., the hand gesture 307 in the example of FIG. 3) and the second indirect engagement indicator (e.g., the gaze location 305 in the example of FIG. 3) are associated with the UI 204, and, responsively, provide a user input to the application underlying the UI 204 based on the hand gesture 307. For example, the electronic device may identify a gesture input based on the hand gesture 307 and provide the gesture input to the application underlying the UI 204. The application may then interpret the gesture input based on UI content displayed to be perceived at the location of the hand gesture. For example, if the UI includes a button or a keyboard, the application may determine that the gesture input is a button push gesture intended for interacting with the button or a key of the keyboard, and process a button push gesture indicator at the gesture location. However, this is merely illustrative, and the gesture input may be a pinch gesture, a grab gesture, a swipe gesture, a push gesture, a pull gesture, a rotate gesture, or any other gesture that can be detected by the electronic device (e.g., using the camera(s) 150 and/or the sensor(s) 152) and used as input to an application. In one or more implementations, a system process of the electronic device 105 may identify the gesture input and spatial coordinates corresponding to the gesture input (e.g., coordinates corresponding to the location within the displayed application content that is intersected by the ray from the user's finger) and may provide an indication of the gesture and/or the spatial coordinates to the application for responding to the gesture input.

In the example of FIG. 3, the hand gesture 307 is a first indirect engagement indicator and the gaze location 305 is a second indirect engagement indicator. In other examples, the gaze location 305 may be a first indirect engagement indicator and a hand gesture or a voice command can be a second indirect engagement indicator. In other examples, a voice command may be a first indirect engagement indicator and a hand gesture or a gaze location can be a second indirect engagement indicator. In these various examples, once the electronic device 105 determines that the first indirect engagement indicator and the second indirect engagement indicator are both associated with a particular UI, the electronic device 105 may provide a user input to the application underlying that particular UI (e.g., based on at least one of the first indirect engagement indicator and the second indirect engagement indicator).

FIG. 3 also illustrates an example in which a direct engagement is performed with respect to the UI 214 (e.g., at a different time from the time when the hand gesture 307 is performed and the gaze location 305 is associated with the UI 204, or at the same time when the hand gesture 307 is performed and the gaze location 305 is associated with the UI 204). For example, the user of the electronic device 105 may perform a direct interaction with the UI 214, such as by performing a hand gesture 315 at the apparent location of the UI 214. For example, the user may use a finger to tap or touch a UI element of the UI 214 at the apparent location at which that UI element is perceived by the user. In one or more implementations, a direct engagement with one UI may override an indirect engagement with another UI or may be processed in parallel with an indirect engagement with another UI. In this way, a user can, for example look at the UI 226, the UI 204, or any other location away from the UI 214, while reaching out with their hand to directly grab and move the UI 214 to a new apparent location (e.g., even while a gaze location 305 of the user is located at the location of the UI 226, the UI 204, or any other location away from the UI 214).

Figure 4:
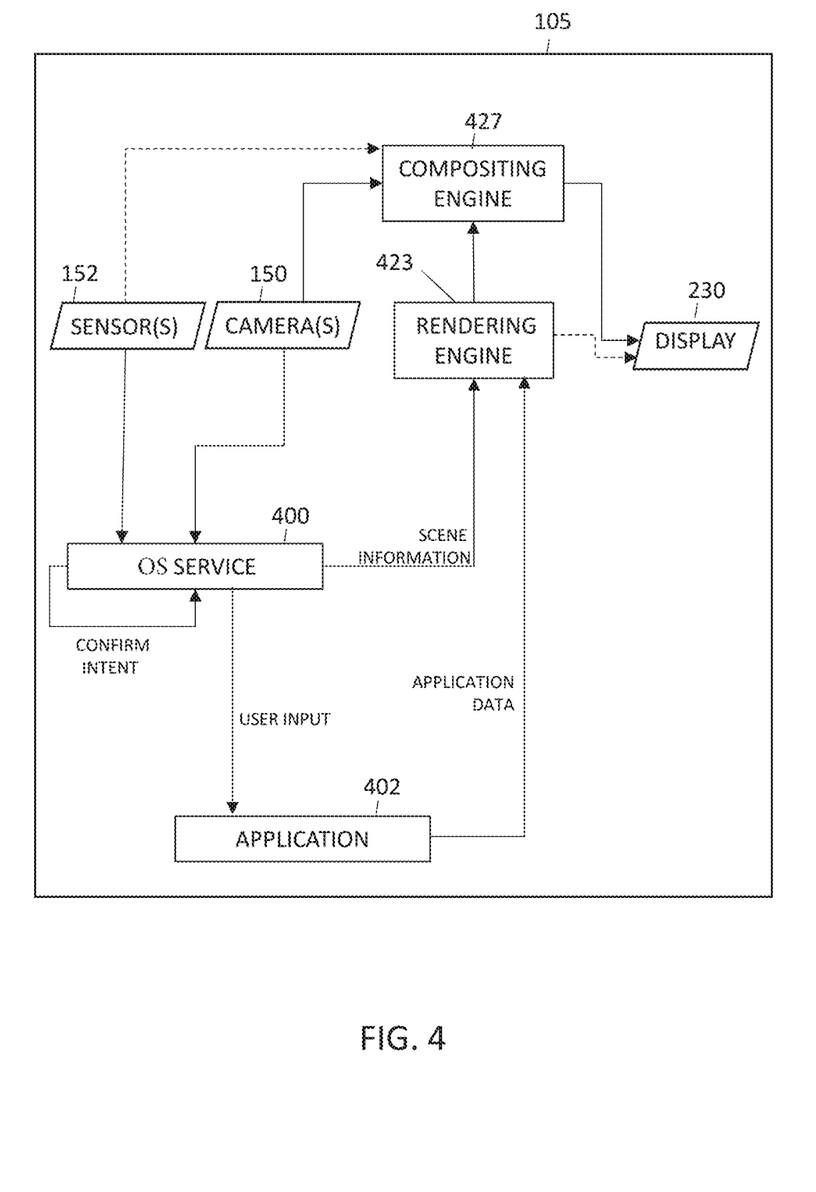
FIG. 4 illustrates an example electronic device providing intention-based user interface control in accordance with one or more implementations.

FIG. 4 illustrates how a system process of the electronic device 105 may determine user intent for a user input prior to providing the user input to an application, in accordance with one or more implementations. For example, FIG. 4 illustrates an example architecture that may be implemented by the electronic device 105 in accordance with one or more implementations of the subject technology. For explanatory purposes, portions of the architecture of FIG. 4 are described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 4 can be implemented in software or hardware, including by one or more processors and a memory device containing instructions, which when executed by the processor cause the processor to perform the operations described herein. For example, in FIG. 4, the trapezoidal boxes may indicate that the sensors 152, the camera(s) 150 and the display 230 may be hardware components, and the rectangular boxes may indicate that the OS service 400 (e.g., an XR service), the application 402, the rendering engine 423, and the compositing engine 427 may be implemented in software, including by one or more processors and a memory device containing instructions, which when executed by the processor cause the processor to perform the operations described herein.

In the example of FIG. 4, an application, such as application 402 (e.g., an application having a UI 204, as illustrated in FIGS. 2 and 3), provides application data to a rendering engine 423 for rendering of the application data, such as for rendering of the UI 204 of the application. Application 402 may be a gaming application, a media player application, a content-editor application, a training application, a simulator application, a social media application, or generally any application that provides a UI or other content for display at an apparent location that is remote from the electronic device 105, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, rendering engine 423 renders the UI 204 for display by a display such as display 230 of the electronic device 105.

In the example of FIG. 4, sensors 152 may provide physical environment information (e.g., depth information from one or more depth sensors, motion information from one or more motion sensors), and/or user information to a system process such as an OS service 400. Camera(s) 150 may also provide images of a physical environment and/or one or more portions of the user (e.g., the user's eyes, hands, face, etc.) to OS service 400. OS service 400 may generate scene information, such as three-dimensional map, of some or all of the physical environment of electronic device 105 using the environment information (e.g., the depth information and/or the images) from sensors 152 and camera(s) 150. The OS service 400 may also determine a gaze location, such as gaze location 305 of FIG. 3, based on images and/or other sensor data representing the position and/or orientation of the user's eye(s). The OS service 400 may also identify a gesture (e.g., a hand gesture) performed by a user of the electronic device 105, based on images and/or other sensor data representing the position and/or orientation of the user's hand(s) and/or arm(s). The OS service 400 may also determine a ray extending from a part of the user, such as extending from a hand of the user in a direction determined by the hand of the user. The OS service 400 may also determine a location (e.g., spatial coordinates) of a gesture input based on the ray extending from the part of the user, and/or based, in part, on a gaze location. In one or more implementations, the sensors 152 include one or more microphones. The OS service 400 may identify one or more voice commands in voice inputs received by the microphones.

As illustrated in FIG. 4, in one or more implementations, the OS service 400 may confirm user intent (e.g., user intent to interact with UI of an application such as the application 402), prior to providing a user input based on the sensor signals and/or the camera images to the application 402. Application 402 may include code that, when executed by one or more processors of electronic device 105, generates application data, for display of the UI 204 on, near, attached to, or otherwise associated with an anchor location corresponding to the anchor identified by the identifier provided from OS service 400. Application 402 may include code that, when executed by one or more processors of electronic device 105, modifies and/or updates the application data based on the user input (e.g., a gaze location, a voice command, and/or a gesture input) provided by the OS service 400 following the engagement/intent confirmation by the OS service 400.

Once the application data has been generated, the application data can be provided to the OS service 400 and/or the rendering engine 423, as illustrated in FIG. 4. As shown, scene information can also be provided to rendering engine 423. The scene information provided from the OS service 400 to the rendering engine 423 can include or be based on, as examples, environment information such as a depth map of the physical environment, and/or object information for detected objects in the physical environment. Rendering engine 423 can then render the application data from application 402 for display by display 230 of electronic device 105 to appear at a desired location in the physical environment 200. For example, the representation 304 of the UI 204 may be rendered for display at the appropriate location on the display 230 for each eye of the user, to appear at a desired location in the physical environment 200, using the application data and the scene information from the OS service 400. Display 230 may be, for example, an opaque display, and camera(s) 150 may be configured to provide a pass-through video feed to the opaque display. The UI 204 may be rendered for display at a location on the display corresponding to the displayed location of a physical anchor object in the pass-through video. Display 230 may be, as another example, a transparent or translucent display. The UI 204 may be rendered for display at a location on the display corresponding to a direct view, through the transparent or translucent display, of the physical environment 200.

As shown, in one or more implementations, electronic device 105 can also include a compositing engine 427 that composites video images of the physical environment, based on images from camera(s) 150, for display together with the UI 204 from rendering engine 423. For example, compositing engine 427 may be provided in an electronic device 105 that includes an opaque display, to provide pass-through video to the display. In an electronic device 105 that is implemented with a transparent or translucent display that allows the user to directly view the physical environment, compositing engine 427 may be omitted or unused in some circumstances, or may be incorporated in rendering engine 423. Although the example of FIG. 4 illustrates a rendering engine 423 that is separate from OS service 400, it should be appreciated that OS service 400 and rendering engine 423 may form a common service and/or that rendering operations for rendering content for display can be performed by the OS service 400. Although the example of FIG. 4 illustrates a rendering engine 423 that is separate from application 402, it should be appreciated that, in some implementations, application 402 may render content for display by display 230 without using a separate rendering engine. Although a single application 402 is depicted in FIG. 4, it is appreciated that multiple applications may be running concurrently on the electronic device 105, generating application data for rendering of respective UIs for display (e.g., concurrent display of multiple UIs as in the examples of FIGS. 2 and 3) by display 230, and each receiving confirmed user inputs from the OS service 400 when the OS service 400 determines a user's intent to engage with the UI of that application.

Figure 5:
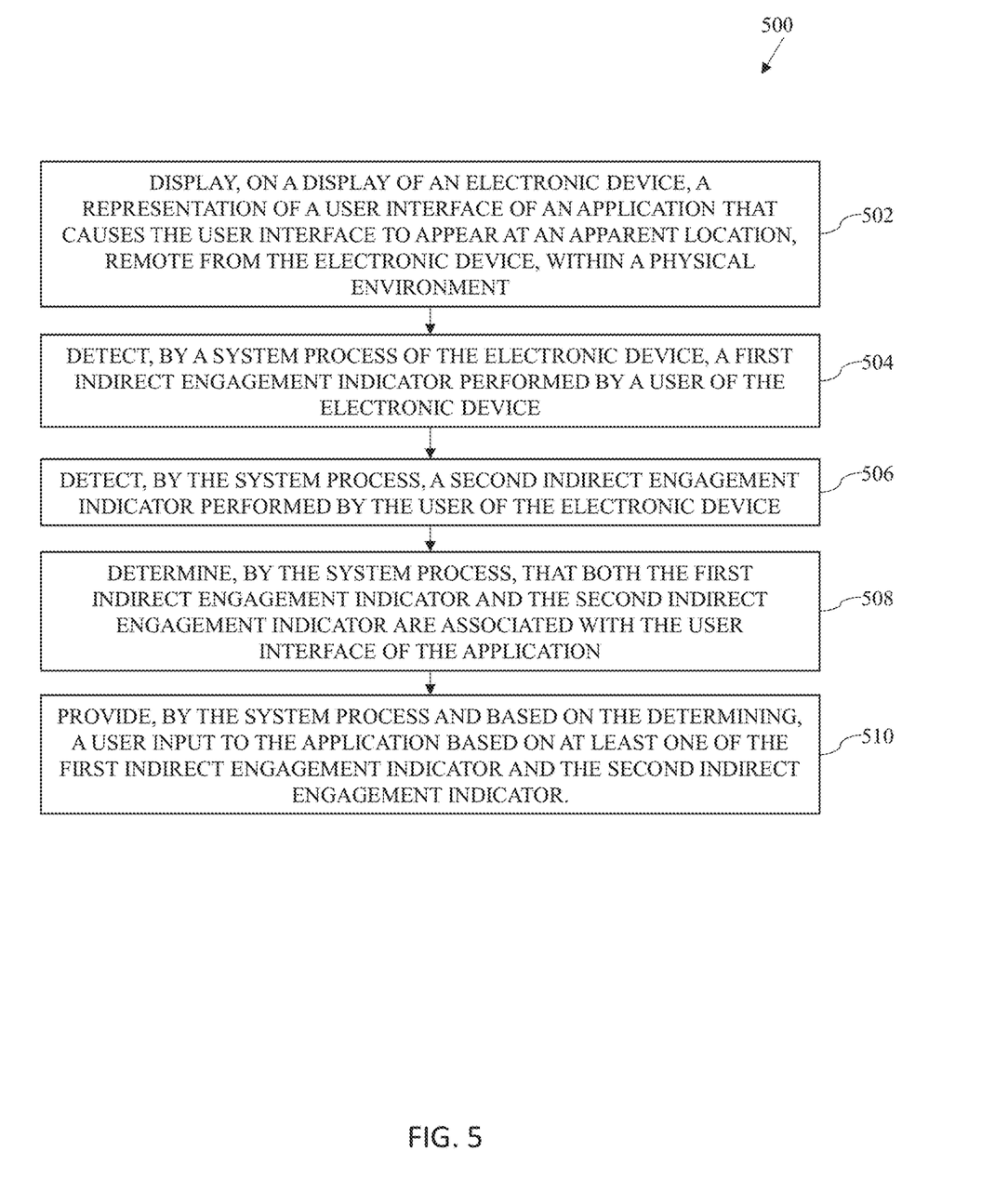
FIG. 5 illustrates a flow diagram of an example process for intention-based user interface control according to aspects of the subject technology.

FIG. 5 illustrates a flow diagram of an example process 500 for providing intention-based user interface control in accordance with implementations of the subject technology. For explanatory purposes, the process 500 is primarily described herein with reference to the electronic device 105 of FIG. 1. However, the process 500 is not limited to the electronic device 105 of FIG. 1, and one or more blocks (or operations) of the process 500 may be performed by one or more other components of other suitable devices, including the electronic device 104, the electronic device 110, and/or the electronic device 115. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, at block 502, an electronic device (e.g., electronic device 105) displays, on a display (e.g., display 230) of the electronic device, a representation (e.g., a representation 304) of a user interface (e.g., UI 204) of an application (e.g., application 402) that causes the user interface to appear at an apparent location (e.g., physical anchor location 205), remote from the electronic device, within a physical environment (e.g., physical environment 200).

At block 504, a system process (e.g., OS service 400) of the electronic device may detect (e.g., using camera(s) 150 and/or sensor(s) 152) a first indirect engagement indicator performed by a user of the electronic device. As examples, the first indirect engagement indicator may include a gaze direction (e.g., a gaze direction 303) that intersects with the user interface, a hand gesture (e.g., a hand gesture 307) performed at a location between the display of the electronic device and the apparent location of the user interface, or a voice input to a voice assistant application of the electronic device.

At block 506, a system process of the electronic device may detect (e.g., using camera(s) 150 and/or sensor(s) 152) a second indirect engagement indicator performed by the user of the electronic device. As examples, the second indirect engagement indicator may include a gaze direction (e.g., a gaze direction 303) that intersects with the user interface, a hand gesture (e.g., a hand gesture 307) performed at a location between the display of the electronic device and the apparent location of the user interface, or a voice input to a voice assistant application of the electronic device. In one or more implementations, detecting the first indirect engagement indicator may include detecting the first indirect engagement indicator concurrently with detecting the second indirect engagement indicator.

At block 508, the system process may determine that both the first indirect engagement indicator and the second indirect engagement indicator are associated with the user interface of the application. As examples, the system process may determine that the user is concurrently looking at and gesturing toward the user interface, that the user concurrently looking at and speaking about the user interface, or that the user is concurrently gesturing toward and speaking about the user interface. In one or more implementations, determining that both the first indirect engagement indicator and the second indirect engagement indicator are associated with the user interface of the application may include determining that the first indirect engagement indicator is associated with the user interface based, in part, on a ray extending from a part of the user through the user interface. For example, the electronic device may identify a ray corresponding to a gaze direction (e.g., gaze direction 303 of FIG. 3) and determine that the gaze direction intersects with a particular user interface. As another example, the electronic device may identify a ray, such as ray 309 of FIG. 3, extending along a direction determined by some or all of a user's hand, and determine that the ray defined by the user's hand intersects with the same particular user interface. In one or more implementations, the electronic device may disambiguate between multiple UIs through which one or more of the rays pass.

At block 510, the system process may provide, based on the determining, a user input to the application based on at least one of the first indirect engagement indicator and the second indirect engagement indicator. As examples, the user input comprises a user gesture input based on the hand gesture or a voice command based on the voice input. In one example use case, the first indirect engagement indicator includes a gaze direction that intersects with the user interface, and the second indirect engagement indicator includes a hand gesture performed at a location between the user and the location of the user interface. In this example use case, the user input may be a user gesture input based on the hand gesture.

In another example use case, the first indirect engagement indicator includes a gaze direction that intersects with the user interface, and the second indirect engagement indicator includes a voice input to a voice assistant application of the electronic device. In this example use case, the user input may be a voice command based on the voice input. In another example use case, the first indirect engagement indicator may include a hand gesture performed at a location between the user and the location of the user interface, and the second indirect engagement indicator may include a voice input to a voice assistant application of the electronic device. In this example use case, the user input may include a voice command based on the voice input or a user gesture input based on the hand gesture.

In the example of FIG. 5, the process 500 may confirm the user's intent to interact with or engage with the user interface prior to (e.g., generating and) providing a user input to an application that provides that user interface. In one or more implementations, the process 500 may also include not providing user input to an application when the user intent is not confirmed. For example, in one or more implementations, the process 500 may include detecting, by the system process, a third indirect engagement indicator (e.g., one of a gaze location, a gesture, or a voice command) performed by the user; detecting, by the system process, a fourth indirect engagement indicator (e.g., a different one of the gaze location, the gesture, or the voice command) performed by the user; determining, by the system process, that the third indirect engagement indicator is associated with the user interface of the application; determining, by the system process, that the fourth indirect engagement indicator is not associated with the user interface of the application; and proceeding without providing any user input associated with the third indirect engagement indicator or the fourth indirect engagement indicator to the application. For example, in one illustrative use case, the electronic device 105 may identify a user gesture directed toward the UI 226 while the user is looking at the UI 214 (e.g., while the gaze location 305 of the user is located at the apparent displayed location of the UI 214), and may not provide user input to either of the UI 226 or the UI 214. In one or more implementations, proceeding without providing any user input associated with the third indirect engagement indicator or the fourth indirect engagement indicator to the application may include continuing to detect gaze locations, user gestures, and/or voice commands as potential inputs to various displayed user interfaces.

In one or more implementations, the process 500 may also include a direct engagement with one UI overriding an indirect engagement with another UI that is concurrently displayed. For example, in one or more implementations, the process 500 may include detecting, by the system process, a third indirect engagement indicator (e.g., one of a gaze location, a gesture, or a voice command) performed by the user in association with the user interface of the application; detecting, by the system process and concurrently with detecting the third indirect engagement indicator, a direct engagement gesture (e.g., a gesture performed at the apparent displayed location of a user interface) performed by the user in association with another user interface of another application running on the electronic device; and providing an additional user input to the other application based on the direct engagement gesture without providing any information associated with the third indirect engagement indicator to the application. For example, in one illustrative use case, the electronic device 105 may determine that the user is looking at the UI 214 while performing a grasping gesture at the apparent location of the UI 226 in the physical environment. In this use case, the electronic device 105 (e.g., the OS service 400) may provide a grasp gesture input to the application providing the UI 226, and not provide any user input to the application providing the UI 214.

In one or more use cases, a direct engagement with a UI may also be performed by a user at a time when an indirect engagement is not received with respect to another UI. In these and/or other use cases, the electronic device 105 may detect, by the system process, a direct engagement gesture (e.g., a hand gesture such as the hand gesture 315 of FIG. 3) performed by the user at the apparent location of the user interface (e.g., at the location in the physical environment at which the user interface appears to be displayed), and provide an additional user input to the application based on the direct engagement gesture.

As described above, aspects of the subject technology may include the collection of data. The present disclosure contemplates that in some instances, this collected data may include personal information data that uniquely identifies or can be used to identify a specific person. Such personal information data can include scene information, sensor data, data associated with the user's eyes, hands, etc., demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing intention-based user interface control. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing intention-based user interface control, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
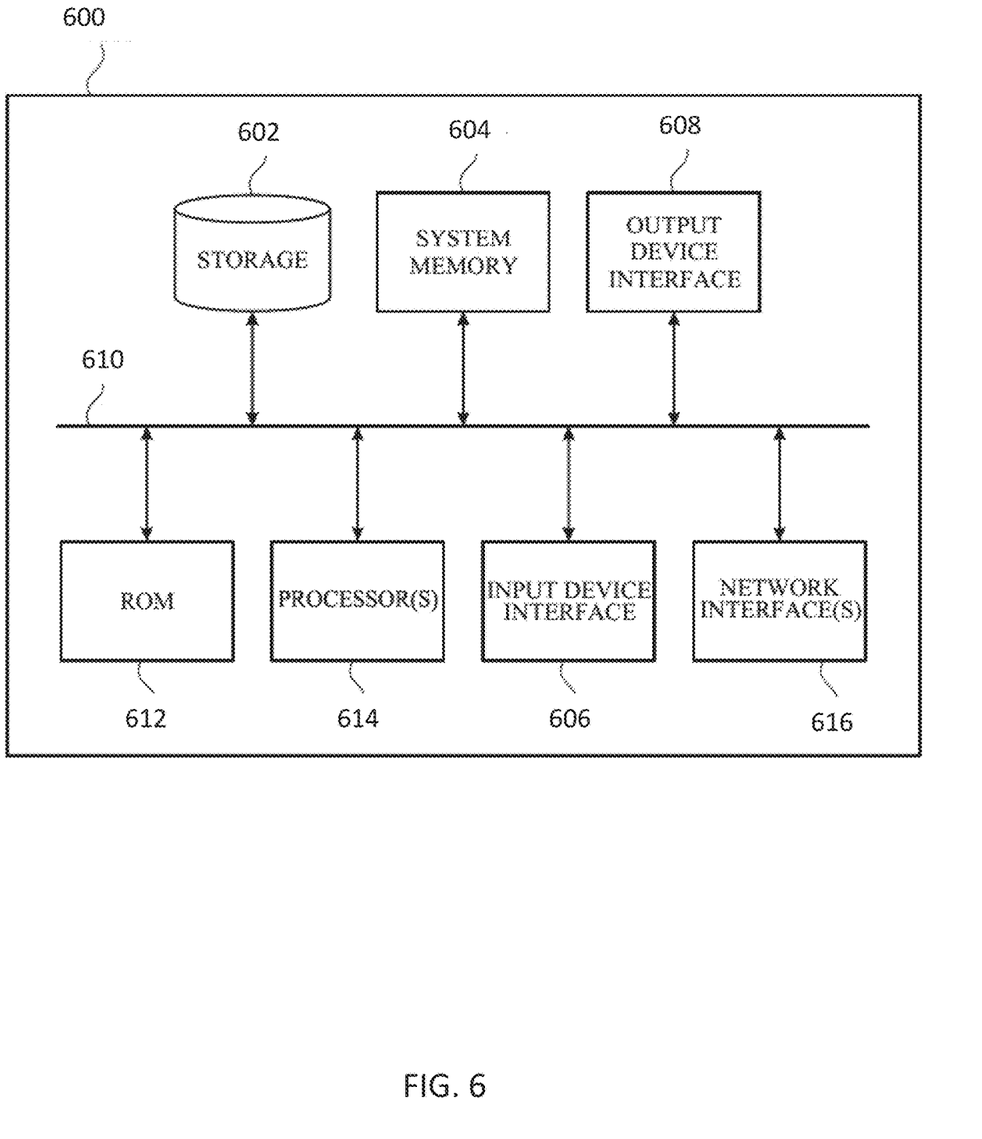
FIG. 6 illustrates an example computing device with which aspects of the subject technology may be implemented.

FIG. 6 illustrates an example computing device with which aspects of the subject technology may be implemented in accordance with one or more implementations. The computing device 600 can be, and/or can be a part of, any computing device or server for generating the features and processes described above, including but not limited to a laptop computer, a smartphone, a tablet device, a wearable device such as a goggles or glasses, and the like. The computing device 600 may include various types of computer readable media and interfaces for various other types of computer readable media. The computing device 600 includes a permanent storage device 602, a system memory 604 (and/or buffer), an input device interface 606, an output device interface 608, a bus 610, a ROM 612, one or more processing unit(s) 614, one or more network interface(s) 616, and/or subsets and variations thereof.

The bus 610 collectively represents all system, peripheral, and chipset buses that communicatively connect the numerous internal devices of the computing device 600. In one or more implementations, the bus 610 communicatively connects the one or more processing unit(s) 614 with the ROM 612, the system memory 604, and the permanent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the computing device 600. The permanent storage device 602, on the other hand, may be a read-and-write memory device. The permanent storage device 602 may be a non-volatile memory unit that stores instructions and data even when the computing device 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 614 may need at runtime. In one or more implementations, the processes of the subject disclosure are stored in the system memory 604, the permanent storage device 602, and/or the ROM 612. From these various memory units, the one or more processing unit(s) 614 retrieves instructions to execute and data to process in order to execute the processes of one or more implementations.

The bus 610 also connects to the input and output device interfaces 606 and 608. The input device interface 606 enables a user to communicate information and select commands to the computing device 600. Input devices that may be used with the input device interface 606 may include, for example, alphanumeric keyboards and pointing devices (also called "cursor control devices"). The output device interface 608 may enable, for example, the display of images generated by computing device 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 610 also couples the computing device 600 to one or more networks and/or to one or more network nodes through the one or more network interface(s) 616. In this manner, the computing device 600 can be a part of a network of computers (such as a LAN, a wide area network ("WAN"), or an Intranet, or a network of networks, such as the Internet. Any or all components of the computing device 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    displaying, on a display of an electronic device, a representation of a user interface of an application that causes the user interface to appear to be displayed at an apparent location, remote from the electronic device, within a physical environment;
    detecting, by a system process of the electronic device, a first indirect engagement indicator performed by a user of the electronic device;
    detecting, by the system process, a second indirect engagement indicator performed by the user of the electronic device;
    withholding, from the application, a user input corresponding to at least one of the first indirect engagement indicator or the second indirect engagement indicator;
    after withholding the user input from the application, determining, by the system process, that both the first indirect engagement indicator and the second indirect engagement indicator are associated with the user interface of the application; and
    after determining that both the first indirect engagement indicator and the second indirect engagement indicator are associated with the user interface of the application, providing, by the system process and based on the determining, the user input to the application based on at least one of the first indirect engagement indicator or the second indirect engagement indicator.

2. The method of claim 1, further comprising:
    detecting, by the system process, a direct engagement gesture performed by the user at the apparent location of the user interface; and
    providing an additional user input to the application based on the direct engagement gesture.

3. The method of claim 1, wherein the first indirect engagement indicator comprises a gaze direction that intersects with the user interface, and the second indirect engagement indicator comprises a hand gesture performed at a location between the display of the electronic device and the apparent location of the user interface.

4. The method of claim 3, wherein the user input comprises a user gesture input based on the hand gesture.

5. The method of claim 1, wherein the first indirect engagement indicator comprises a gaze direction that intersects with the user interface, and the second indirect engagement indicator comprises a voice input to a voice assistant application of the electronic device.

6. The method of claim 5, wherein the user input comprises a voice command based on the voice input.

7. The method of claim 1, wherein the first indirect engagement indicator comprises a hand gesture performed at a location between the display of the electronic device and the apparent location of the user interface, and the second indirect engagement indicator comprises a voice input to a voice assistant application of the electronic device.

8. The method of claim 7, wherein the user input comprises a voice command based on the voice input.

9. The method of claim 1, wherein determining that both the first indirect engagement indicator and the second indirect engagement indicator are associated with the user interface of the application comprises determining that the first indirect engagement indicator is associated with the user interface based, in part, on a ray extending from a part of the user through the user interface.

10. The method of claim 1, wherein detecting the first indirect engagement indicator comprises detecting the first indirect engagement indicator concurrently with detecting the second indirect engagement indicator.

11. The method of claim 1, further comprising:
    detecting, by the system process, a third indirect engagement indicator performed by the user;
    detecting, by the system process, a fourth indirect engagement indicator performed by the user;

determining, by the system process, that the third indirect engagement indicator is associated with the user interface of the application;

determining, by the system process, that the fourth indirect engagement indicator is not associated with the user interface of the application; and proceeding without providing any user input associated with the third indirect engagement indicator or the fourth indirect engagement indicator to the application.

12. The method of claim 1, further comprising:

detecting, by the system process, a third indirect engagement indicator performed by the user in association with the user interface of the application;

detecting, by the system process and concurrently with detecting the third indirect engagement indicator, a direct engagement gesture performed by the user in association with an other user interface of an other application running on the electronic device; and providing an additional user input to the other application based on the direct engagement gesture without providing any information associated with the third indirect engagement indicator to the application.

13. An electronic device, comprising:

a display component;

a memory; and one or more processors configured to:

display, on the display component, a representation of a user interface of an application that causes the user interface to appear at an apparent location, remote from the display component of the electronic device, within a physical environment;

detect, by a system process of the electronic device, a first indirect engagement indicator performed by a user of the electronic device;

detect, by the system process, a second indirect engagement indicator performed by the user of the electronic device;

withhold, from the application, a user input corresponding to at least one of the first indirect engagement indicator or the second indirect engagement indicator;

after withholding the user input from the application, determine, by the system process, that both the first indirect engagement indicator and the second indirect engagement indicator are associated with the user interface of the application; and after determining that both the first indirect engagement indicator and the second indirect engagement indicator are associated with the user interface of the application, provide, by the system process and based on the determination, the user input to the application based on at least one of the first indirect engagement indicator or the second indirect engagement indicator.

14. The electronic device of claim 13, wherein detecting the first indirect engagement indicator comprises detecting the first indirect engagement indicator concurrently with detecting the second indirect engagement indicator.

15. The electronic device of claim 13, wherein the one or more processors are configured to determine that both the first indirect engagement indicator and the second indirect engagement indicator are associated with the user interface of the application, in part, by determining that the first indirect engagement indicator is associated with the user interface based, in part, on a ray extending from a part of the user through the user interface.

16. The electronic device of claim 13, wherein the one or more processors are further configured to:

detect, by the system process, a third indirect engagement indicator performed by the user;

detect, by the system process, a fourth indirect engagement indicator performed by the user;

determine, by the system process, that the third indirect engagement indicator is associated with the user interface of the application;

determine, by the system process, that the fourth indirect engagement indicator is not associated with the user interface of the application; and proceed without providing any user input associated with the third indirect engagement indicator or the fourth indirect engagement indicator to the application.

17. The electronic device of claim 13, wherein the one or more processors are further configured to:

detect, by the system process, a third indirect engagement indicator performed by the user in association with the user interface of the application;

detect, by the system process and concurrently with detecting the third indirect engagement indicator, a direct engagement gesture performed by the user in association with an other user interface of an other application running on the electronic device; and provide an additional user input to the other application based on the direct engagement gesture without providing any information associated with the third indirect engagement indicator to the application.

18. The electronic device of claim 13, wherein the first indirect engagement indicator comprises a gaze location, and the second indirect engagement indicator comprises a hand gesture or a voice command.

19. The electronic device of claim 18, wherein the user input comprises a gesture input based on the hand gesture.

20. A non-transitory computer-readable medium storing instructions that, when executed by one or more processors, cause the one or more processors to perform operations comprising:

displaying, on a display of an electronic device, a representation of a user interface of an application that causes the user interface to appear at an apparent location, remote from the electronic device, within a physical environment;

detecting, by a system process of the electronic device, a first indirect engagement indicator performed by a user of the electronic device;

detecting, by the system process, a second indirect engagement indicator performed by the user of the electronic device;

withholding, from the application, a user input corresponding to at least one of the first indirect engagement indicator or the second indirect engagement indicator;

after withholding the user input from the application, determining, by the system process, that both the first indirect engagement indicator and the second indirect engagement indicator are associated with the user interface of the application; and after determining that both the first indirect engagement indicator and the second indirect engagement indicator are associated with the user interface of the application, providing, by the system process and based on the determining, the user input to the application based on at least one of the first indirect engagement indicator or the second indirect engagement indicator.

* * * * *